(12) United States Patent
Echasserieau

(10) Patent No.: US 12,339,365 B2
(45) Date of Patent: Jun. 24, 2025

(54) STRIPPING METHOD USING A LASER SOURCE

(71) Applicant: Airbus Operations SAS, Toulouse (FR)

(72) Inventor: Gilles Echasserieau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 855 days.

(21) Appl. No.: 17/539,506

(22) Filed: Dec. 1, 2021

(65) Prior Publication Data

US 2022/0179084 A1 Jun. 9, 2022

(30) Foreign Application Priority Data

Dec. 4, 2020 (FR) ...................................... 2012696

(51) Int. Cl.
*G01S 17/89* (2020.01)
*G01B 11/25* (2006.01)

(52) U.S. Cl.
CPC .............. *G01S 17/89* (2013.01); *G01B 11/25* (2013.01)

(58) Field of Classification Search
CPC ....... G01S 17/89; G01B 11/25; B23K 26/032; B23K 26/04; B23K 26/36
See application file for complete search history.

(56) References Cited

U.S. PATENT DOCUMENTS

| 5,643,476 A * | 7/1997 | Garmire ................. B23K 26/04 |
| | | 219/121.81 |
| 6,288,362 B1 | 9/2001 | Thomas et al. |
| 2012/0145685 A1 | 6/2012 | Ream et al. |
| 2021/0205920 A1 | 7/2021 | Shiraishi et al. |

FOREIGN PATENT DOCUMENTS

| EP | 3702089 A1 | 9/2020 |
| WO | 2015119587 A2 | 8/2015 |

OTHER PUBLICATIONS

French Search Report; priority document.

* cited by examiner

*Primary Examiner* — Robert G Bachner
(74) *Attorney, Agent, or Firm* — Greer, Burns & Crain, Ltd.

(57) ABSTRACT

A method and a system for stripping a part which includes visualizing a zone to be stripped on a screen using a camera, aligning a center of the zone to be stripped with a pattern overlaid on the screen, defining a stripping dimension around the center of the zone to be stripped and controlling a laser source to have the laser source strip the zone to be stripped within that dimension. Such a method makes it possible to correctly visualize the positioning of the laser source with respect to the zone to be stripped before the stripping operation.

10 Claims, 1 Drawing Sheet

STRIPPING METHOD USING A LASER SOURCE

CROSS-REFERENCES TO RELATED APPLICATIONS

This application claims the benefit of the French patent application No. 2012696 filed on Dec. 4, 2020, the entire disclosures of which are incorporated herein by way of reference.

FIELD OF THE INVENTION

The present invention relates to a stripping method using a laser source, and a stripping system implementing such a method.

BACKGROUND OF THE INVENTION

In order to strip a part, for example to remove paint around a bore, it is known practice to use a brush or counterbore. These tools are dimensioned for a single diameter, and it is then necessary to have a different tool for each diameter to be stripped. Furthermore, if these tools are ill-used, they can create scratches on the part.

Another principle consists in using a laser source, the beam radius of which can be set in order to strip the part over the desired surface. Although such a tool gives good results, it is often complicated to correctly position the laser with respect to the zone to be stripped.

SUMMARY OF THE INVENTION

One object of the present invention is to propose a method for stripping a part which uses a laser source and a camera that makes it possible to easily and correctly position the laser source with respect to the zone to be stripped.

To this end, a method is proposed for stripping a zone to be stripped of a part, using a stripping system comprising a pedestal having a base, a camera and a laser source borne by the pedestal in which the laser source comprises an emitter of a laser beam and a directional system, a screen on which a pattern is materialized, a user interface, a control unit which controls the camera, the laser source and which communicates with the screen and the user interface.

The stripping method comprising:
  a placement step during which the base is positioned on the part so as to orient the camera towards the zone to be stripped,
  a transmission step during which the camera continuously transmits an image of the zone to be stripped to the screen via the control unit,
  a display step during which the screen continuously displays the duly transmitted image with the pattern overlaid,
  an adjustment step during which the camera and the laser source are displaced on the part so as to align the center of the zone to be stripped with the pattern while continuing the transmission and display steps,
  a definition step during which a dimension of the zone to be stripped is input using the user interface,
  a recording step during which the duly input dimension is transmitted to the control unit, and
  a stripping step during which the control unit controls the directional system to have a laser beam sweep the zone to be stripped thus defined by its dimension.

Such a method makes it possible to correctly visualize the positioning of the laser source with respect to the zone to be stripped before the stripping operation.

According to a particular embodiment, the adjustment step is performed by displacement of the base on the part.

According to a particular embodiment, the adjustment step is performed by displacement of the camera and of the laser source on the pedestal by a motorized system.

Advantageously, the displacement is controlled by directional keys of the user interface.

Advantageously, the displacement is controlled by the control unit from an analysis of the image by the control unit.

The invention also proposes a system for stripping a zone to be stripped of a part, the stripping system being intended to implement a stripping method according to one of the preceding variants and comprising:
  a control unit,
  a pedestal intended to be positioned on the part,
  a camera borne by the pedestal and intended to continuously transmit an image of the zone to be stripped to the control unit,
  a laser source borne by the pedestal and comprising an emitter of a laser beam and a directional system that are controlled by the control unit,
  a screen configured to continuously display the image from the camera transmitted by the control unit with a pattern overlaid, and
  a user interface communicating with the control unit.

Advantageously, the stripping system comprises a dolly to which the camera and the laser source are fixed, and it comprises a motorized system mounted on the pedestal between the pedestal and the dolly and controlled by the control unit.

Advantageously, the base extends around the zone to be stripped and has a recess intended to come against the part, the stripping system comprises a suction system comprising a suction means fixed to the base and sucking the air from the recess through an orifice passing through a wall of the base, and the stripping system comprises a tube fixed tightly between the base and the pedestal, in which the tube is disposed around the laser source and the camera.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
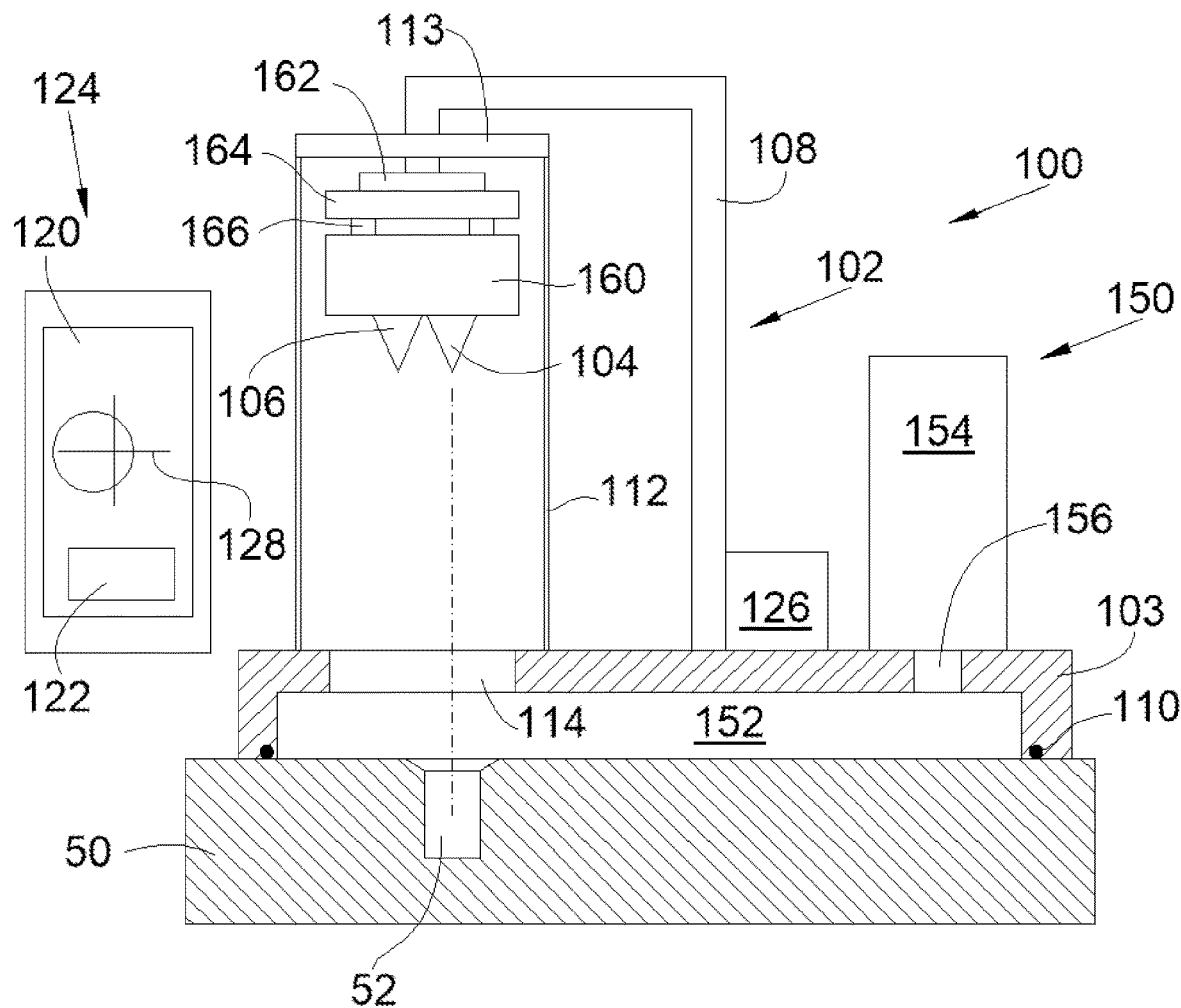
FIG. 1 is a side view of a stripping system according to the invention.

FIG. 1 shows a stripping system 100 for stripping a part 50, here around a bore 52. In the following description, the stripping is presented as a stripping around the bore 52, but it can be a stripping around another feature of the part 50, and, generally, around a center of a zone to be stripped.

The stripping system 100 comprises a pedestal 102 which has a base 103 which is positioned on the part 50. The pedestal 102 bears a camera 104 and a laser source 106. The camera 104 and the laser source 106 are borne here by a bracket 108 forming part of the pedestal 102 and fixed to the base 103. The laser source 106 and the camera 104 are secured to one another inasmuch as a displacement of one drives the same displacement for the other.

The camera 104 is oriented towards the zone to be stripped, here the riser of the bore 52.

The laser source 106 comprises an emitter of a laser beam and a directional system which makes it possible to direct the laser beam in the desired direction. The directional system is, for example, a system of two mirrors controlled position-wise by galvanometers.

In the embodiment of the invention presented in FIG. 1, the base 103 extends around the zone to be stripped and it has a hole 114 through which the laser beam passes and through which the camera 104 can see the zone to be stripped.

The stripping system 100 also comprises a screen 120 which can, for example, be a computer screen or a screen of a multifunction mobile (or "smartphone") and a user interface 122 which can, for example, be a keyboard or a touch zone of the screen 120. In the embodiment of the invention presented here, the screen 120 and the user interface 122 are grouped together on a multifunction mobile 124.

On the screen 120, a pattern 128 is materialized.

The stripping system 100 also comprises a control unit or controller 126 which controls the camera 104, the laser source 106 and which communicates with the screen 120 and the user interface 122. Depending on the case, the communication between the control unit 126 and the various elements of the stripping system 100 can be performed through a wired link or through a wireless link, such as, for example, through a Bluetooth©, Wifi© or other link.

Figure 2:
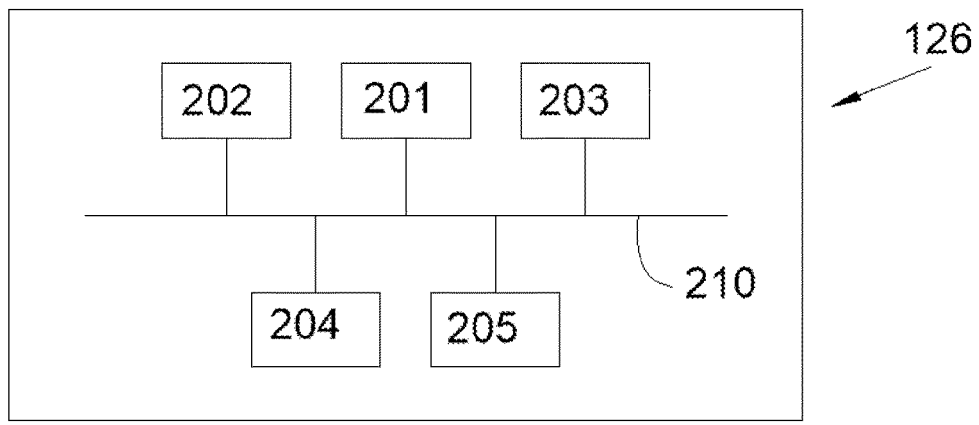
FIG. 2 schematically represents an example of hardware arrangement of a control unit used in the stripping system.

FIG. 2 schematically illustrates an example of hardware arrangement of the control unit 126.

The example of hardware architecture presented comprises, linked by a communication bus 210: a CPU (Central Processing Unit) processor 201; a random access memory RAM (Random Access Memory) 202; a read-only memory ROM (Read-Only Memory) 203 or a flash memory; a storage unit or a storage medium reader, such as an SD (Secure Digital) card reader or a hard disk HDD (Hard Disk Drive) 204; and at least one input-output interface 205 for communicating with the other elements of the stripping system 100, such as, for example, the camera 104, the laser source 106, the screen 120 and the user interface 122.

The CPU processor 201 is capable of executing instructions loaded into the RAM memory 202 from the ROM memory 203, from an external memory (such as an SD card), from a storage medium (such as a hard disk HDD), or from a communication network. Upon power up, the CPU processor 201 is capable of reading instructions from the RAM memory 202 and of executing them. These instructions form a computer program causing the implementation, by the CPU processor 201, of all or part of the algorithms and steps described here.

Thus, all or part of the algorithms and steps described here can be implemented in software form by execution of a set of instructions by a programmable machine, such as a DSP (Digital Signal Processor) or a microcontroller or a processor. All or part of the algorithms and steps described here can also be implemented in hardware form by a machine or a dedicated component, such as an FPGA (Field-Programmable Gate Array) or an ASIC (Application-Specific Integrated Circuit). Thus, the information processing system comprises electronic circuitry adapted and configured to implement the algorithms and steps described here.

A stripping method according to the invention implemented using the stripping system 100 comprises:
  a placement step during which the base 103 is positioned on the part 50 so as to orient the camera 104 towards the zone to be stripped,
  a transmission step during which the camera 104 continuously transmits an image of the zone to be stripped to the screen 120 via the control unit 126,
  a display step during which the screen 120 continuously displays the duly transmitted image with the pattern 128 overlaid,
  an adjustment step during which the camera 104 and the laser source 106 are displaced on the part 50 so as to align the center of the zone to be stripped with the pattern 128 while continuing the transmission and display steps,
  a definition step during which a dimension of the zone to be stripped is input using the user interface 122,
  a recording step during which the duly input dimension is transmitted to the control unit 126, and
  a stripping step during which the control unit 126 controls the directional system to have the laser beam sweep the zone to be stripped thus defined by its dimension.

The dimension is, for example, the radius or the diameter of the zone to be stripped around the center of the zone to be stripped. The stripping then comprises stripping the zone to be stripped which is around the center and within the limit defined by the dimension.

Thus, by displacing the camera 104 and the laser source 106 by continuously visualizing the position of the center of the zone to be stripped with respect to the pattern 128 and when the axis of the camera 104 is aligned with the center of the zone to be stripped, here the center of the bore 52, the laser beam covers the zone around the center and the zone to be stripped is perfectly delimited by its center and its dimension.

Obviously, the geometrical data of the stripping system 100 are known and recorded in a memory of the control unit 126. For example, these are data relating to the distance between the camera 104 and the laser source 106, the distance between the laser source 106 and the part 50 which make it possible to determine the position of the center of the zone to be stripped with respect to the laser source 106 and construct the path of the laser beam.

In a manual embodiment, the adjustment step is performed manually by displacement of the base 103 on the part 50.

In a motorized embodiment, the adjustment step is performed by displacing the camera 104 and the laser source 106 on the pedestal 102 by a motorized system mounted on the pedestal 102 between the pedestal 102 and the camera 104 and laser source 106 assembly. The motorized system is controlled by the control unit 126. In this embodiment, the base 103 is preferentially fixed to the part 50 by any appropriate fixing means such as, for example, clamping systems or a suction system 150 which is described hereinbelow.

In this embodiment, the camera 104 and the laser source 106 are fixed to a dolly 160 mounted to be movable in translation on the pedestal 102, here on the bracket 108, in two horizontal directions at right angles in order to allow the displacement of the dolly 160 in all of the horizontal plane. A motorized system is arranged to displace the dolly 160 to the desired position by displacing it in the two directions. The motorized system is controlled by the control unit 126. The camera 104 and the laser source 106 are thus fixed to the dolly 160 and the motorized system is mounted on the pedestal 102 between the pedestal 102 and the dolly 160.

The displacement can be controlled manually by directional keys of the user interface 122 in which the displacement instructions are transmitted to the motorized system through the control unit 126.

The displacement can be controlled automatically by the control unit 126, for example from an analysis of the image by the control unit 126. The analysis comprises, for example, a recognition of the center of the zone to be stripped, for example, here, by recognition of the form of the bore 52 on the image received from the camera 104 and estimation of the position of its center from this recognition or of a detection of variation of color between the center of the zone to be stripped, here the center of the bore 52, and the surrounding paint. The control unit 126 thus determines the center of the zone to be stripped and controls the motorized system to displace the camera 104 and the laser source 106 in order to align the axis of the camera 104 with the pattern 128 on the screen 120.

According to an exemplary implementation, the pedestal 102 comprises two first rails 162 oriented parallel to a first horizontal direction, a runner 164 mounted to be movable on the two first rails 162, a first actuator (motor, cylinder, etc.) arranged to displace the runner 164 along the first rails 162, two second rails 166 oriented parallel to a second horizontal direction, in which the dolly 160 is mounted to be movable on the two second rails 166, and a second actuator (motor, cylinder, etc.) arranged to displace the dolly 160 along the second rails 166.

Obviously, any other system allowing the displacement of the dolly 160 in the horizontal plane is appropriate.

The base 103 extends around the zone to be stripped and has a recess 152 which comes against the part 50. The suction system 150 comprises a suction means 154 which is fixed to the base 103 and which sucks the air from the recess 152 through an orifice 156 passing through a wall of the base 103. Thus, the suction of the air from the recess 152 creates a vacuum in the recess 152 and ensures that the pedestal 102 is well held on the part 50. The suction means 154 is also controlled by the control unit 126 and comprises, for example, a fan which is made to rotate to suck the air.

A seal 110 can be fixed to the base 103 and come between the base 103 and the part 50 to ensure a better seal-tightness.

Such a suction system 150 also makes it possible to suck out the debris resulting from the stripping in order to keep a stripped zone clean.

To protect people from the laser beam, a tube 112 is disposed around the laser source 106 and the camera 104 and extending between the pedestal 102 and the base 103.

In the embodiment of the invention presented here, the tube 112 is fixed between the base 103 and the pedestal 102, here via a support 113 secured to the bracket 108. In the case of the use of the suction system 150, the fixing of the tube 112 to the bracket 108 and to the base 103 is a tight fixing to limit the intake of air and ensure the fixing of the base 103. In the embodiment of the invention presented here, the tube 112 is around the dolly 160 to allow it to be displaced inside the tube 112.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for stripping a zone to be stripped of a part, using a stripping system comprising:
   a pedestal having a base and a dolly which is movably mounted on the pedestal, the dolly including a camera and laser source fixed to the dolly, wherein
   the laser source comprises an emitter of a laser beam and a directional system,
   a screen on which a pattern is materialized,
   a user interface, and
   a controller which controls the dolly and which communicates with the screen and the user interface,
   the stripping method comprising:
      a placement step comprising positioning the base on the part to orient the camera towards the zone to be stripped,
      a transmission step comprising continuously transmitting, via the camera, an image of the zone to be stripped to the screen via the controller,
      a display step comprising continuously displaying, via the screen, the transmitted image with the pattern overlaid,
      an adjustment step comprising displacing the camera and the laser source together on the part by displacing the dolly to which the laser source and the camera are fixed to align a center of the zone to be stripped with the pattern while continuing the transmission and display steps,
      a definition step comprising inputting a dimension of the zone to be stripped using the user interface,
      a recording step comprising transmitting the input dimension to the controller, and
      a stripping step comprising controlling the directional system, via the controller to make the laser beam sweep the zone to be stripped thus defined by its dimension.

2. The stripping method according to claim 1, wherein the adjustment step is performed by displacement of the base on the part.

3. The stripping method according to claim 1, wherein the adjustment step is performed by displacement of the camera and of the laser source on the pedestal by a motorized system.

4. The stripping method according to claim 3, wherein the displacement is controlled by directional keys of the user interface.

5. The stripping method according to claim 3, wherein the displacement is controlled by the controller from an analysis of the image by the controller.

6. A system for stripping a zone to be stripped of a part, said stripping system being configured to implement a stripping method according to claim 1 and comprising:
   the controller,
   the pedestal configured to be positioned on the part,
   the camera borne by the pedestal and configured to continuously transmit the image of the zone to be stripped to the controller,
   the laser source the screen configured to continuously display the image from the camera transmitted by the controller with the pattern overlaid, and the user interface communicating with the controller.

7. The stripping system according to claim 6, further comprising:

a motorized system mounted on the pedestal between the pedestal and the dolly and controlled by the controller, such that the motorized system is arranged to displace the dolly to the desired position by displacing the dolly in two directions.

8. The stripping system according to claim 6, wherein the base extends around the zone to be stripped and has a recess configured to come against the part, wherein the stripping system comprises a suction system comprising a suction means fixed to the base and configured to suck air from the recess through an orifice passing through a wall of the base, and wherein the stripping system comprises a tube fixed tightly between the base and the pedestal, in which the tube is disposed around the laser source and the camera.

9. The stripping method according to claim 3, wherein the motorized system is mounted on the pedestal between the pedestal and the dolly and is controlled by the controller, such that the motorized system is arranged to displace the dolly to the desired position by displacing the dolly in two directions.

10. The stripping method according to claim 3, wherein the dolly is mounted on a bracket which forms part of the pedestal and is fixed to the base.

* * * * *